United States Patent

Barabash

[11] Patent Number: 5,842,991
[45] Date of Patent: Dec. 1, 1998

[54] ULTRASOUND TRANSDUCER WITH EXTENDED FIELD OF VIEW

[76] Inventor: Leonid S. Barabash, 13021 S. 48th St., Apt. 2097, Phoenix, Ariz. 85044

[21] Appl. No.: 802,757

[22] Filed: Feb. 20, 1997

[51] Int. Cl.$^6$ .................................................. G03B 42/06
[52] U.S. Cl. .......................................... 600/443; 600/447
[58] Field of Search ........................ 128/660.08, 661.01, 128/660.07, 662.03; 367/104, 7

[56] References Cited

U.S. PATENT DOCUMENTS

| | | | |
|---|---|---|---|
| 4,915,115 | 4/1990 | Sasaki et al. | 128/660.05 |
| 4,949,310 | 8/1990 | Smith et al. | 367/7 |
| 5,148,810 | 9/1992 | Maslak et al. | 128/661.01 |

Primary Examiner—George Manuel
Assistant Examiner—Maulin Patel

[57] ABSTRACT

Presented invention employs an ultrasound transducer that irradiates and receives the echo signals from an investigated part of a human body into a solid angle which is two times larger than for a prior art cross transducer. Preferred embodiment of the transducer has two transmit arrays turned at an angle of $\pm \psi/2$ out of the plane of the receive array. Transmit arrays form flat acoustic beams to provide the left (17) and right (18) field of views. Transmit and receive arrays are placed normally to each other. The extension of the field of view along the lateral coordinate is provided by a successive energizing of transmit arrays which form flat acoustic beams irradiating different sectors of a human body.

1 Claim, 2 Drawing Sheets

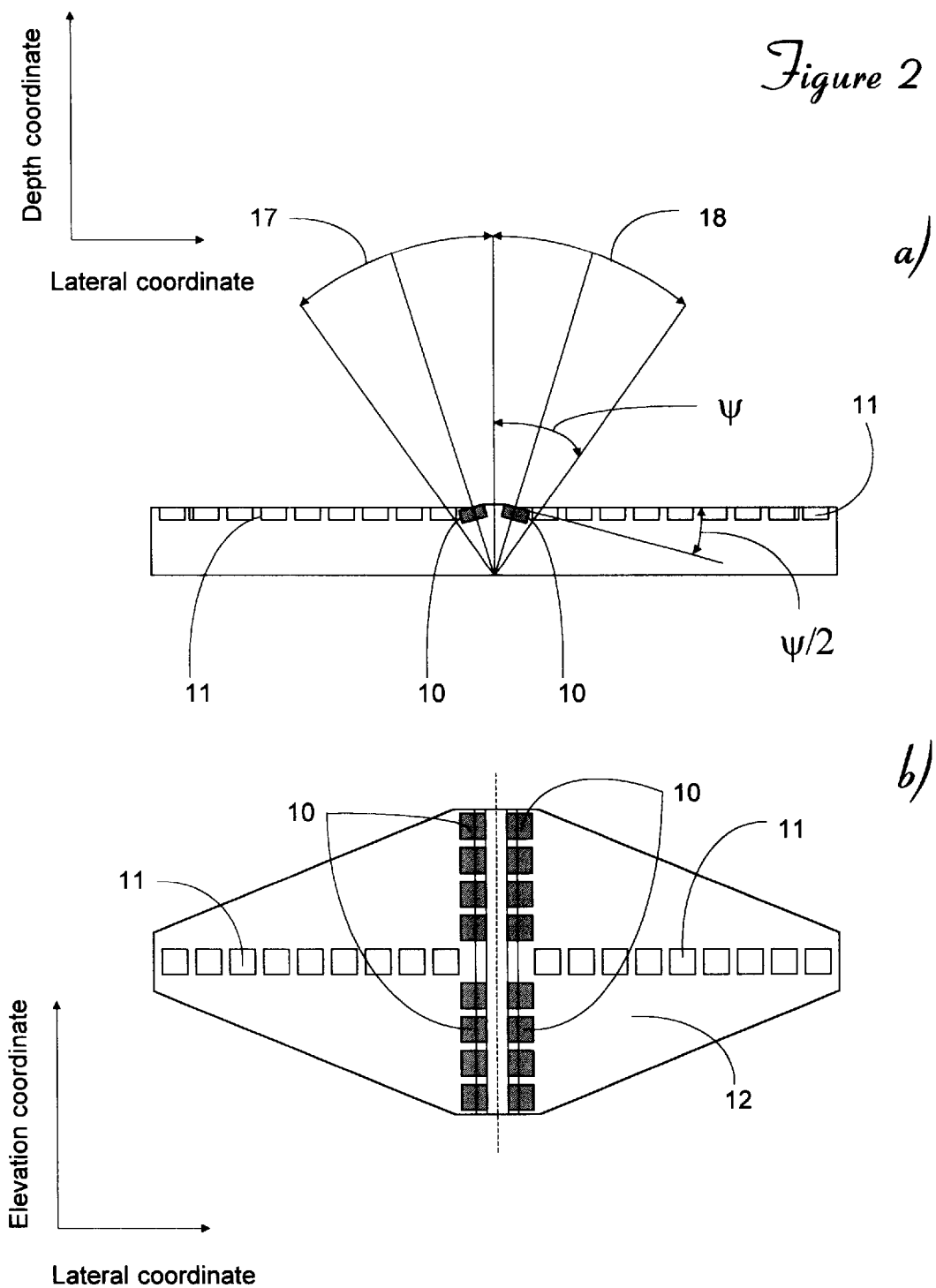

ULTRASOUND TRANSDUCER WITH EXTENDED FIELD OF VIEW

DESCRIPTION

1. Field of the Invention

The present invention relates to an ultrasound transducer for investigations of human body structures. More precisely, the invention relates to a cross transducer, which allows transmission and reception of electronically scanned acoustic beams and three dimensional reconstruction of real-time anatomical imaging.

2. State of the Art

Methods and apparatus have been devised for the three dimensional ultrasound imaging of human body structures by the acquisition of two dimensional images, which after analysis are reconstructed into three dimensional images.

Patent application Ser. No. 08/742403 of L. S. Barabash et al. discloses an ultrasound apparatus which receives three dimensional images from electronically scanned flat acoustic beams formed by a cross array transducer. A scanned pencil acoustic beam is produced by the intersection of flat acoustic beams and flat receive apertures. Two crossed arrays or systems of arrays which have axial symmetry and cross at an optimal angle shape these beams and receive apertures. The two array systems are separated completely including the ground electrodes. One system works only in transmission mode, sending acoustic beams into the investigated target (i.e. human body). The other system works only in reception mode, and receives the reflected echo signals from the investigated target. This design allows us to reconstruct three dimensional images of anatomic structures.

The intensity of wave radiation along the coordinate parallel to the plane of the flat acoustic beam which is formed by the transmit array (or the flat synthetic receive aperture which is formed by software tools in memory of a computer) is limited by the size of the array individual elements. Smaller sizes of array individual elements realize wider and more uniform angular intensity distributions of the flat acoustic beam and larger ranges of the scan angles, and also limit the radiated acoustic power and reduce the required noise floor for the reception apparatus connected with the receive array individual elements.

SUMMARY OF INVENTION

The transducer design presented here realizes extended far and near fields of view and can register echo signals reflected from irradiated parts of a human body into a larger solid angle than prior art cross transducers. This goal is achieved by shifting the origin of the pencil acoustic beam along lateral and elevation coordinates and by the use of multiple flat acoustic beams which irradiate different sectors of a human body.

For preferred embodiment it can be done by the use of two transmit arrays placed in parallel to each other, whose planes are physically turned relative to each other, and also turned at some angle relative to the receive array plane. The turn of the transmit arrays provides two flat acoustic beams which irradiate different sectors of a human body.

BRIEF DESCRIPTION OF THE DRAWINGS

These features and advantages of the present invention will be better seen by reference to the detail description with accompanying drawings wherein:

FIG. 2 presents the drawing of the transducer composed of two transmit and one receive arrays and planes of the transmit arrays are turned at an angle $\pm\psi/2$ relative to the receive array plane.

DETAILED DESCRIPTION

Figure 1:
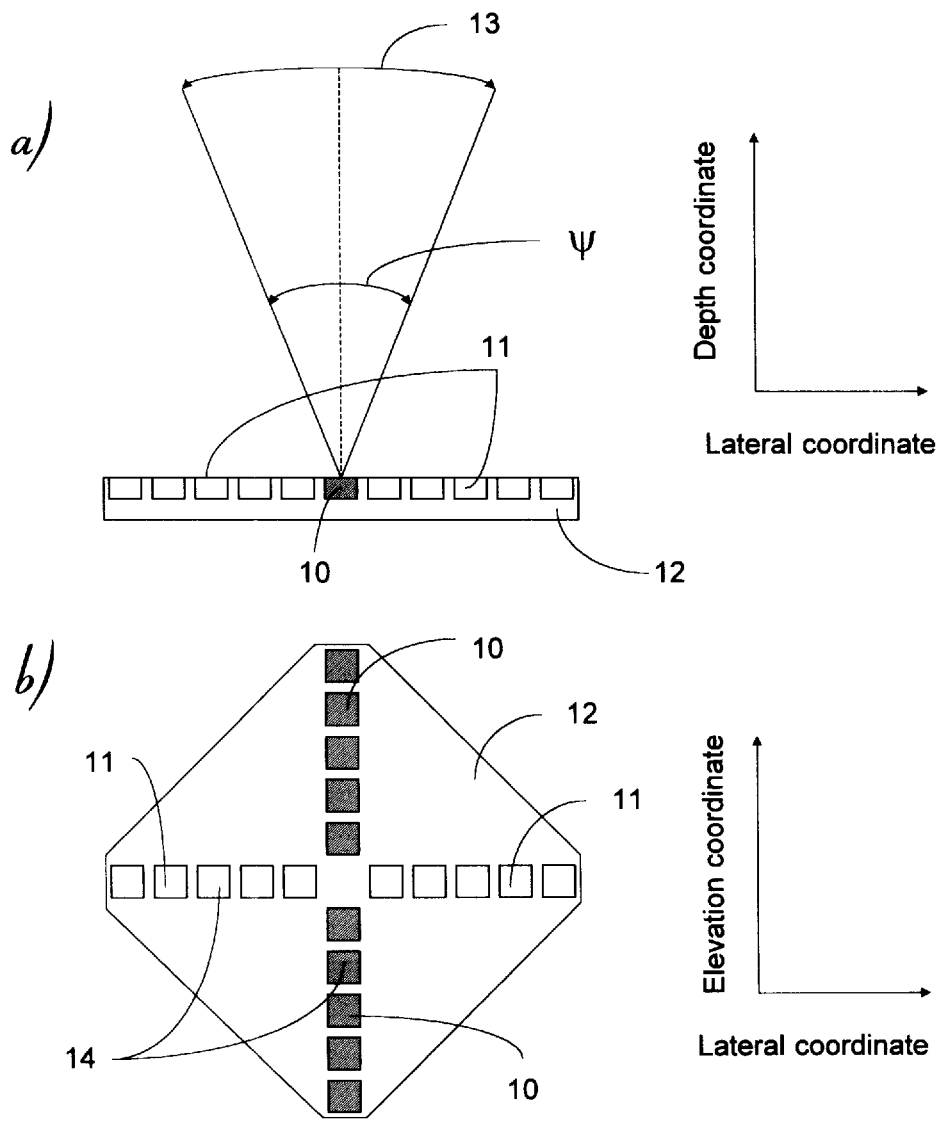
FIG. 1. shows an exemplary drawing of a prior art cross transducer.

FIG. 1 shows schematically a prior art cross transducer: side view (FIG. 1a) and top view (FIG. 1b). The transducer comprises separate transmit 10 and receive 11 arrays placed on the body of transducer 12. The field of view 13 is defined by the size of the individual elements 14 of the transducer arrays. Here we show one projection of the field of view. The second projection is the same as the first one. The field of view 13 of such kind of transducer has a maximal angle $\psi$ and is defined by the array individual element size. The increase of the field of view is possible by the decrease of the array individual element size. However, the acoustic power radiated by a transmit array with small size of individual elements is low, and the noise floor of the reception apparatus must be reduced sufficiently. Furthermore, the transducer near field of view is limited strongly because the origin of the pencil acoustic beam is fixed at one point on the surface of transducer.

The design of the transducer with extended field of view is shown in FIG. 2. The transducer has two transmit 10 and one receive 11 arrays. All arrays are placed on the flat surface of the transducer body 12 but the transmit arrays are turned at an angle of $\pm\psi/2$ relative to the plane of the receive array.

Every transmit array forms its own flat acoustic beam, dynamically focused and electronically scanned along the elevation coordinate. It is done by the transmit part of apparatus which provides the form of the necessary transmit apertures. The focal distances and scan angles are changed by the delays of the transmit array individual elements energizing.

Sets of transmit array individual elements can be used in transmit apertures and the form of the flat acoustic beam. The position of the set and the number of transmit individual elements in the transmit aperture control by the transmit part of apparatus which provides the shift of the transmit aperture and the shaped flat acoustic beam along elevation coordinate.

Echo signals reflected from the sector of a human body irradiated by the flat transmit beam are registered by the receive array individual elements. The reception part of the apparatus is connected with the receive array individual elements, and provides amplification of echo signals, conversion of echo signal amplitudes into digital code and memorization of the digitized information. The reception part allows us to form synthetic flat receive apertures by processing the digitized amplitude information from different receive array individual elements. This includes shifting of digitized amplitude information in the memory of a computer or on a special board by a specified number of delay steps in accordance with a map of delays for the chosen receive aperture, and summation of the digitized information along the depth coordinate. As a result, dynamically focused and scanned flat receive apertures can be shaped by the use of software tools only. The placement of the receive array normal to the direction of transmit arrays realizes the dynamic focusing and scanning of the flat receive apertures along lateral coordinate.

The planes of the flat receive apertures are parallel to the elevation coordinate and can be scanned along the lateral coordinate within some angular limits defined by the size of the receive array individual elements, which are the same size as the transmit array individual elements.

The flat acoustic beam and the flat receive aperture are crossed at an angle of 90° and form a pencil acoustic beam at their intersection. The scanning of the flat transmit acoustic beam along the elevation coordinate and the flat receive apertures along the lateral coordinate allows us to change the position of the pencil acoustic beam in space and to realize dynamic focusing and scanning of the pencil acoustic beam along both lateral and elevation coordinates into some solid angle.

The transmit arrays 10 (see FIG. 2) form the flat acoustic beams 17 and 18 shifted in space relative to each other at the angle defined by the angle between the planes of transmit arrays. The flat acoustic beams 17 and 18 are shaped by different transmit arrays with the same transmit aperture, and so, they are situated in one plane. A successive energizing of transmit arrays with the set scan angle and focal distance realizes the irradiation of two different sectors of an investigated part of a human body by two flat transmit beams. After the reception, amplification, digitization and memorization of echo signal amplitudes from each receive array individual element, a composite two dimensional image can be reconstructed. This procedure is performed by software tools only and includes the scanning of irradiated sectors by synthetic receive apertures and subsequent summation of digitized amplitude information along a depth of the investigated media. The change of the scan angle along the elevation coordinate and the successive energizing of left and right transmit arrays 10 make it possible to irradiate other sectors of a human body and reconstruct a series of composite two dimensional images of the investigated media along the elevation coordinate. As a result, three dimensional image of irradiated solid angle of investigated media will be obtained.

The use of two transmit arrays with planes of arrays turned at the angle ±ψ/2 relative to the plane of the receive array increases the far field of view and the scanning ability of the transducer along one (lateral) coordinate. The solid angle irradiated by the transducer is increased by a factor of two approximately. Additionally, shifting the transmit and receive array individual element sets along the elevation and lateral coordinates away from the crossing point of transmit and receive arrays realizes the extension of the transducer near field of view by shifting the origin of the pencil acoustic beam along both lateral and elevation coordinates.

Successive energizing of transmit arrays is provided by the transmit part of the apparatus. The switching between the alternate transmit arrays and different sets of transmit and receive array individual elements can be used to reduce the volume of the transmit and reception apparatus. The switching of transmit arrays, sets of transmit array individual elements, or sets of receive array individual elements, is necessary to form the focal zones for different depths in the investigated media when different numbers of array individual elements must be used.

The principles of switching among different sets of transducer individual elements are known very well and described in many articles and patents. However, when the same array individual elements are used simultaneously for both the transmission of acoustic wave packages into the investigated media and for the reception of reflected echo signals from the irradiated part of the investigated media, the functions of the described switches are joined. They should provide both high voltage-high current transmission mode and low voltage-low current reception mode. The juxtaposition of these contradictory requirements in one device makes it difficult to realize a good noise performance.

These functions are separated in the invention described here. Different arrays and different switches are used for realization of transmission and reception modes. One set of switches provides the switching of transmit arrays or sets of transmit array individual elements, another one can be used for switching of sets of receive array individual elements. Separating the functions of the switches in transmission and reception modes makes possible the use of low noise switches in reception part of apparatus and a realization of a good noise performance.

What is claimed is:

1. An ultrasound transducer with extended field of view comprising:

two transmit arrays having a plurality of individual elements, said individual elements are connected with a pulse driver apparatus only which provides a form of transmit apertures by delay of a transmit individual elements energizing, said transmit arrays provide a form of their own flat acoustic beams which can be dynamically focused and scanned along elevation coordinate and irradiate sectors of a human body, a receive array having a plurality of individual elements, said individual elements provide the reception of the echo signals from irradiated sectors of a human body and are connected with reception apparatus only where echo signal amplitudes are amplified, converted into digital code, memorized as a digital information, which is used for a shape of synthetic receive apertures dynamically focused and scanned along lateral coordinate, said transmit arrays are placed parallel to each other and shape flat acoustic beams situated in one plane, said transmit arrays are placed with angle ±ψ/2 relative to a plane of a receive array, whereby an extension of field of view of transducer is achieved by the placement at relative angles and the successive energizing of transmit arrays which forms their flat acoustic beams and irradiate different sectors of a human body.

* * * * *